(No Model.)

C. H. TALLMAN.
INCASED OIL CAN.

No. 296,248. Patented Apr. 1, 1884.

Attest,
N. A. Clark
E. M. Fowler

Inventor
Charles H. Tallman
by Geo. W. Aker
atty

UNITED STATES PATENT OFFICE.

CHARLES H. TALLMAN, OF BELLAIRE, OHIO.

INCASED OIL-CAN.

SPECIFICATION forming part of Letters Patent No. 296,243, dated April 1, 1884.

Application filed June 1, 1883. (No model.)

*To all whom it may concern:*

Be it known that I, CHARLES H. TALLMAN, of Bellaire, in the county of Belmont and State of Ohio, have invented a new and useful Improvement in Incased Oil-Cans; and I do hereby declare that the following is a full and exact description of the same, reference being had to the accompanying drawings, and to the letters of reference marked thereon.

My invention relates to incased glass oil-cans, and its object is to provide for catching any drip or overflow of oil from the pouring-spout or filling-orifice in a way for convenient removal, and, further, to add to the strength of the glass vessels and to render such glass portions of the can less liable to breakage. The novelty therein consists in forming a groove or recess upon and entirely around the top of the glass vessel, between its outer shoulder and the bottom of its neck, the top of said shoulder and the bottom of the neck being on about the same horizontal plane, and both being below the top edge of the metal jacket employed.

For the better understanding of the invention, reference will be made to the accompanying drawings, in which—

Figure 1:
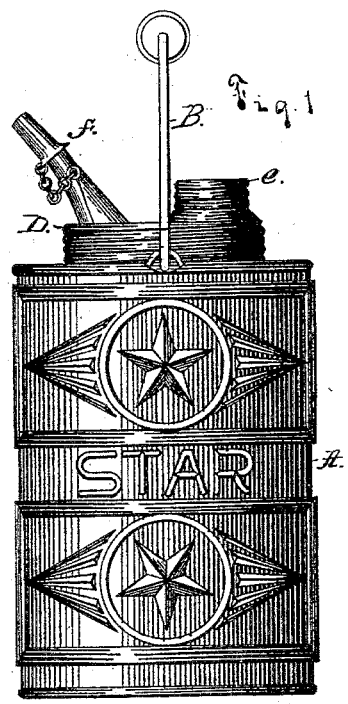
Figure 2:
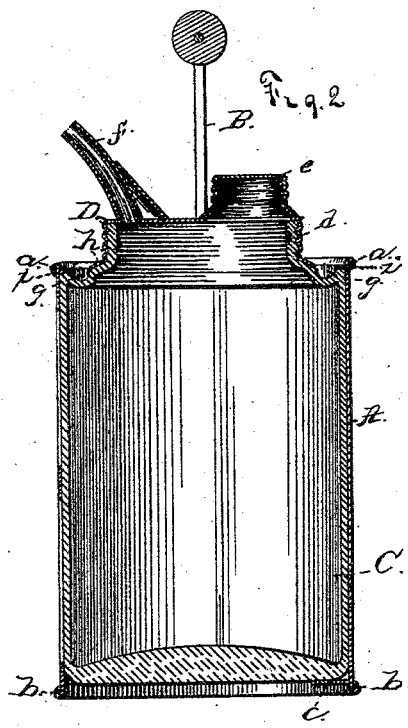

Figure 1 represents an elevation in perspective, and Fig. 2 a vertical section, of an incased glass oil-can constructed in accordance with my invention.

In the drawings, A represents a metal casing or jacket formed of a single piece of metal, the ends of which are suitably joined. The upper edge of this casing or jacket is strengthened by a wire, $a$, to which the bail or handle B is attached. A similar wire, $b$, serves to strengthen the lower edge of said casing and imparts the necessary firmness to the bottom of the can. To the interior of the casing or jacket A, and at a point near the lower edge of the same, is soldered or otherwise firmly secured a flange, $c$, upon which the glass vessel C, to be hereinafter described, rests when inserted into said casing or jacket. At its top the glass vessel C is provided with a neck, $d$, preferably screw-threaded on its outer surface. Upon this neck $d$ the cap D, the interior of which is preferably screw-threaded, is fastened securely with cement in the ordinary way. In this cap are placed the filling-tube $e$ and the nozzle $f$, of a construction well known in the trade.

I make no claim in this application to the parts hereinbefore described, as they are included in a prior application made by me.

In the top of the glass vessel C there is formed a crease or groove, $g$, said groove extending entirely around said top and being of a depth sufficient to catch and retain any overflow or drip from the discharge-spout or receiving-orifice.

When the several parts of the can are in their proper positions, as shown in the drawings, the base $h$ of the cap D and the upper edge of the metal casing or jacket A are practically on the same plane or level, the shoulder $i$ of the glass vessel C being slightly below said base $h$ and below the top of said metal casing, but on about the same horizontal plane with the bottom of the neck $d$.

The advantages I assert for my construction are, first, by the use of the crease or groove $g$ all overflow or drip from the discharge-pipe or receiving-orifice is caught and retained within a small space and can be easily wiped away or removed, and said overflow or drip is prevented from flowing down either over the metal casing A, or between said casing and the glass vessel C, as is the case with ordinary incased glass oil-cans. When the overflow or drip enters between the casing and the glass vessel it becomes practically inaccessible and makes its way to the bottom of the can, where it collects, and smears and soils the spot where the can is placed. By grooving the top of the glass vessel, as described, this difficulty and annoyance is avoided. The second advantage asserted for my construction is that by having the top of the glass vessel grooved between its outer shoulder and the bottom of its neck, said vessel is greatly strengthened. the groove forming an inverted arch between the vertical sides of such vessel. The third advantage asserted is that by having the top of the glass vessel situated below the upper edge of the metal casing said glass vessel is more effectually protected from contact with other objects and rendered less liable to breakage at the very point where the danger of breakage is greatest. To form this groove $g$ in the glass vessel I employ a mold, as hereinafter described, but make no claim to this mold in this application, as the same will form the subject-matter of a subsequent application. The mold is an ordinary glass mold in which the vessel is blown, but is provided with a ring at its top or shoulder, which ring is movable vertically within the mold by means of two arms situated on top of the mold. When the glass is placed within the mold ready for blowing the vessel, this movable ring, which on its lower surface is a counterpart of the groove to be formed, is forced down as far as desired and the glass blown up around it, so as to conform to its shape. When the vessel has been blown, the movable ring is withdrawn from the groove it has formed in the glass, which admits of the mold being opened in the usual manner for the withdrawal of the vessel.

Having thus described my invention, what I claim as new therein, and for which I desire to secure Letters Patent, is—

1. A cylindrical glass vessel, C, having a top recessed between the shoulder $i$ and the bottom of a neck, $d$, the top of said shoulder and the bottom of the neck being on about the same horizontal plane, substantially as described.

2. In an incased oil-can, a cylindrical vessel having a top recessed between the shoulder $i$ and the bottom of a neck, $d$, and an incasing-jacket, A, rising vertically above such shoulder and the bottom of such neck, substantially as and for the purpose described.

In testimony whereof I affix my signature in presence of two witnesses.

CHARLES H. TALLMAN.

Witnesses:
B. J. MYERS,
BENJ. TURNER.